(12) United States Patent
Bae

(10) Patent No.: US 12,120,382 B2
(45) Date of Patent: Oct. 15, 2024

(54) BROADCAST RECEPTION APPARATUS AND OPERATION METHOD THEREOF

(71) Applicant: LG ELECTRONICS INC., Seoul (KR)

(72) Inventor: Seungnam Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/013,167

(22) PCT Filed: Jun. 30, 2021

(86) PCT No.: PCT/KR2021/008235
§ 371 (c)(1),
(2) Date: Dec. 27, 2022

(87) PCT Pub. No.: WO2022/005190
PCT Pub. Date: Jan. 6, 2022

(65) Prior Publication Data
US 2023/0247254 A1    Aug. 3, 2023

(30) Foreign Application Priority Data
Jun. 30, 2020  (KR) ........................ 10-2020-0080149

(51) Int. Cl.
*H04N 21/4363* (2011.01)
*H04N 21/422* (2011.01)

(52) U.S. Cl.
CPC . *H04N 21/43637* (2013.01); *H04N 21/42204* (2013.01)

(58) Field of Classification Search
CPC ....... H04N 21/43637; H04N 21/42204; H04N 21/43615; H04N 21/44227; H04N 21/4583; H04N 21/615; H04N 21/64738; Y02D 30/70
See application file for complete search history.

(56) References Cited

U.S. PATENT DOCUMENTS

| | | | | |
|---|---|---|---|---|
| 2007/0183338 | A1* | 8/2007 | Singh .................... | H04W 16/14 370/252 |
| 2013/0208618 | A1* | 8/2013 | Nakano ............... | H04W 72/541 370/252 |
| 2017/0280351 | A1* | 9/2017 | Skaaksrud ............ | H04W 4/029 |

FOREIGN PATENT DOCUMENTS

| | | |
|---|---|---|
| JP | 2015-507444 | 3/2015 |
| JP | 2019-149638 | 9/2019 |
| KR | 10-0383129 | 10/1997 |
| KR | 10-2012-0029848 | 3/2012 |
| KR | 10-1860918 | 3/2013 |

(Continued)

OTHER PUBLICATIONS

PCT International Application No. PCT/KR2021/008235, International Search Report dated Oct. 12, 2021, 3 pages.

(Continued)

*Primary Examiner* — Adil Ocak
(74) *Attorney, Agent, or Firm* — LEE, HONG, DEGERMAN, KANG & WAIMEY

(57) ABSTRACT

A broadcast receiving apparatus and an operating method thereof. The broadcast receiving apparatus includes a receiver for wirelessly receiving a broadcast signal; an external device interface unit for performing short-range communication; and a controller. The controller determines how various frequency bands are to be used.

8 Claims, 6 Drawing Sheets

(56) References Cited

FOREIGN PATENT DOCUMENTS

KR   10-2017-0083385   7/2017
KR   10-2019-0076636   7/2019

OTHER PUBLICATIONS

Japan Patent Office Application No. 2022-581335, Office Action dated Feb. 13, 2024, 9 pages.

* cited by examiner

BROADCAST RECEPTION APPARATUS AND OPERATION METHOD THEREOF

CROSS-REFERENCE TO RELATED APPLICATIONS

This application is the National Stage filing under 35 U.S.C. 371 of International Application No. PCT/KR2021/008235, filed on Jun. 30, 2021, which claims the benefit of earlier filing date and right of priority to Korean Application No. 10-2020-0080149, filed on Jun. 30, 2020, the contents of which are all incorporated by reference herein in their entirety.

TECHNICAL FIELD

The present disclosure relates to a broadcast receiving apparatus and an operating method thereof.

BACKGROUND ART

An image display apparatus is an apparatus having a function of displaying an image that a user can watch, and the user can watch a broadcast through the image display apparatus. For example, the image display apparatus may include Television (TV), a monitor, a projector, or the like equipped with a liquid crystal display (LCD) using liquid crystal or an OLED display using an organic light emitting diode (OLED).

Recently, a digital TV service using a wired or wireless network communication network has been widely spread, and the digital TV service provides various services that cannot be provided by the existing analog broadcasting service. Here, the digital TV service may include not only digital terrestrial broadcasting, but also digital cable broadcasting, digital satellite broadcasting, IP-TV service, terrestrial and satellite DMB service, VOD service provided through a communication network, and the like.

The image display apparatus displays a broadcast screen based on a broadcast signal of a channel selected by a user, among broadcast signals transmitted in various ways, on a display. In this case, the image display apparatus may directly receive the broadcast signal, or a device such as a set-top box may receive the broadcast signal, and transmit a signal corresponding to the broadcast channel selected by a user to the image display apparatus. As described above, as in Prior Art 1 (Korean Patent Publication No. 10-2016-0021538), the broadcast receiving apparatus for receiving a broadcast signal may receive a broadcast signal wirelessly through an antenna, or may receive a broadcast signal by wire through a cable.

Meanwhile, the broadcast receiving apparatus can also transmit and receive data to and from various external devices by wire/wireless. For example, the broadcast receiving apparatus may receive a control signal corresponding to a user input from the remote control device or transmit an audio signal to an external audio device, through a Bluetooth method which is one of short-range communication methods.

In this case, when the broadcast receiving apparatus wirelessly receives a broadcast signal, there is a possibility that a frequency band used for reception of a broadcast signal and a frequency band set to be used for short-range communication overlap each other. When two frequency bands overlap, due to the distortion of the received broadcast signal, there may be a problem in that noise may be contained in an image output through the image display apparatus, and communication performance between the broadcast receiving apparatus and the remote control device is deteriorated. In addition, when the broadcast receiving apparatus simultaneously uses a plurality of short-range communications using different schemes, for example, when simultaneously using Bluetooth and Wireless Fidelity (Wi-Fi), there is a possibility that the frequency bands set to be used for each short-range communication overlap each other, and even in this case, there may be a problem in that communication performance between the broadcast receiving apparatus and the remote control device is deteriorated.

DISCLOSURE

Technical Problem

An object of the present disclosure is to solve the above and other problems.

Another object of the present disclosure is to provide a broadcast receiving apparatus capable of preventing distortion of a broadcast signal and deterioration of communication performance between a broadcast receiving apparatus and a remote control device, even when a frequency band used for reception of a broadcast signal and a frequency band set to be used for short-range communication overlap, and an operating method thereof.

Another object of the present disclosure is to provide a broadcast receiving apparatus capable of preventing deterioration of communication performance between a broadcast receiving apparatus and a remote control device, even when frequency bands respectively used for a plurality of short-range communication overlap each other, and an operating method thereof.

Technical Solution

In order to achieve the above object, a broadcast receiving apparatus according to an embodiment of the present disclosure includes a broadcast receiving unit configured to wirelessly receive a broadcast signal; an external device interface unit configured to have at least one communication module, and perform short-range communication; and a controller, wherein the controller determines whether a frequency band used for reception of the broadcast signal overlaps with a first frequency band preset for the short-range communication, when the frequency band used for reception of the broadcast signal and the first frequency band do not overlap, determines the first frequency band as a frequency band used for the short-range communication, and when at least a portion of the first frequency band overlaps with the frequency band used for reception of the broadcast signal, determines a second frequency band which is a remaining frequency band, among the first frequency band, excluding a portion overlapping with the frequency band used for reception of the broadcast signal, as the frequency band used for the short-range communication.

Meanwhile, a method of operating a broadcast receiving apparatus according to an embodiment of the present disclosure includes determining whether a frequency band used for reception of broadcast signal and a first frequency band preset for short-range communication overlap; determining the first frequency band as a frequency band used for the short-range communication, when the frequency band used for reception of broadcast signal and the first frequency band do not overlap; and determining a second frequency band, which is a remaining frequency band excluding a portion overlapping the frequency band used for reception of broadcast signal among the first frequency band, as the frequency band used for the short-range communication, when at least a portion of the first frequency band overlaps with the frequency band used for reception of broadcast signal.

Advantageous Effects

Effects of a broadcast receiving apparatus and an operating method thereof according to the present disclosure will be described as follows.

According to various embodiments of the present disclosure, when a frequency band used for reception of a broadcast signal and a frequency band set to be used for short-range communication overlap with each other, among the frequency bands set to be used for short-range communication, the remaining frequency band excluding the band overlapping the frequency band used for receiving broadcast signals is reset to be used for short-range communication, thereby preventing distortion of a broadcast signal and deterioration of communication performance between the broadcast receiving apparatus and the remote control device.

In addition, according to various embodiments of the present disclosure, whenever a main channel is determined or changed, it is determined whether the frequency band used for receiving broadcast signals and the frequency band set to be used for short-range communication overlap, based on data related to a frequency band corresponding to the broadcast channel stored in the broadcast receiving apparatus. Therefore, an operation of transmitting and receiving data with an external device to determine whether communication performance is deteriorated, or an operation of processing data to determine whether communication performance is deteriorated may be omitted, thereby reducing a processing operation, and more quickly determining whether communication performance is deteriorated.

In addition, according to various embodiments of the present disclosure, when frequency bands used for a plurality of short-range communications overlap each other, among the frequency bands set to be used for a first short-range communication, the remaining frequency bands excluding the band overlapping the frequency band used for a second short-range communication are reset to be used for the first short-range communication, thereby preventing deterioration of communication performance between the broadcast receiving apparatus and the remote control device.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. Accordingly, the terms "module" and "unit" may be used interchangeably.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In addition, in the present application, although the terms first, second, etc. may be used to describe various elements, these elements should not be limited by these terms. These terms are only used to distinguish one element from another.

Figure 1A:
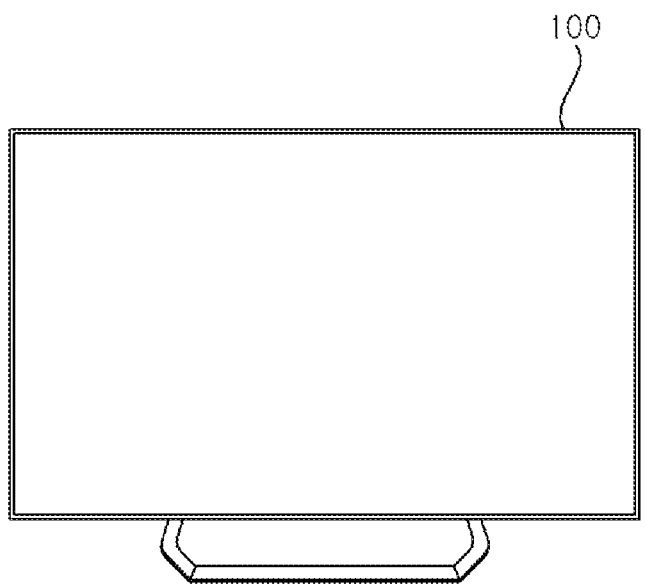
FIGS. 1A and 1B are diagrams illustrating an image display system, according to various embodiments of the present disclosure.
Figure 1A:
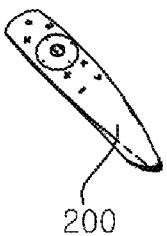
Figure 1B:
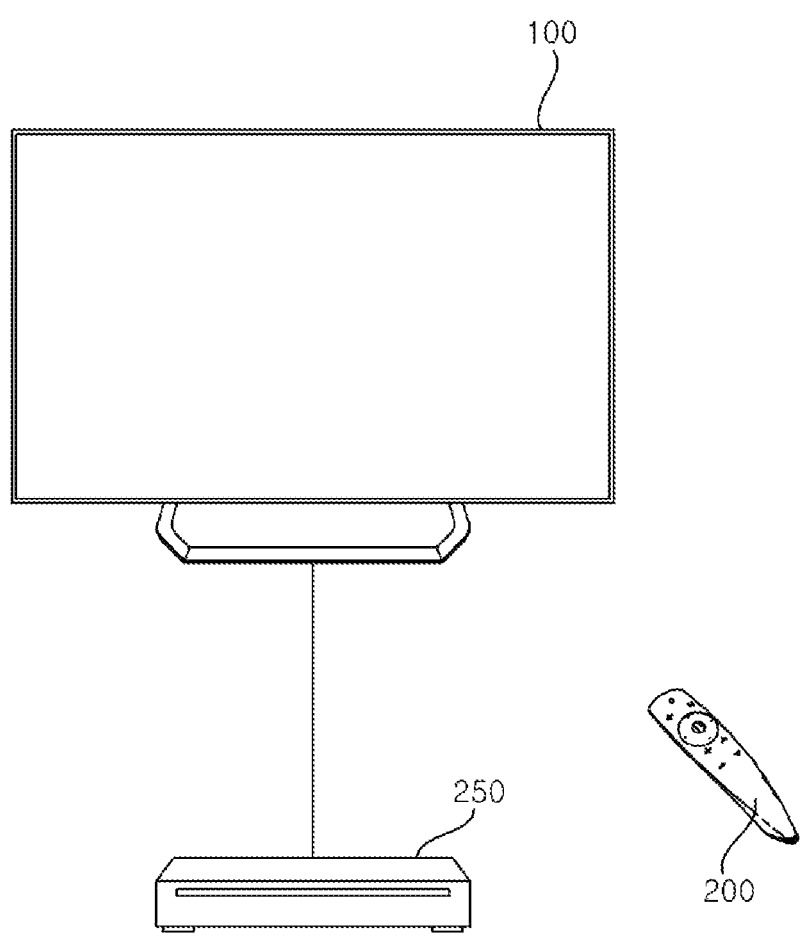

FIG. 1A and FIG. 1B are diagrams illustrating an image display system according to various embodiments of the present disclosure.

Referring to FIG. 1A, an image display system 10 may include an image display apparatus 100 and/or a remote control device 200.

The image display apparatus 100 may be an apparatus that processes and outputs an image. The image display apparatus 100 is not particularly limited as long as it can output a screen corresponding to an image signal, such as a TV, a notebook computer, and a monitor.

The image display apparatus 100 may receive a broadcast signal, process it, and output a signal-processed broadcast image. When the image display apparatus 100 receives a broadcast signal, the image display apparatus 100 may correspond to a broadcast receiving apparatus.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100 and transmits various control signals to the image display apparatus 100 through a established network, or receives a signal related to various operations processed in the image display apparatus 100 from the image display apparatus 100.

For example, various input devices such as a mouse, a keyboard, a space remote control, a trackball, and a joystick may be used as the remote control device 200. The remote control device 200 may be referred to as an external device, and hereinafter, it is clarified in advance that an external device and a remote control device can be used interchangeably if necessary.

The image display apparatus 100 may be connected to only a single remote control device 200 or may be simultaneously connected to two or more remote control devices 200, and may change an object displayed on a screen or adjust the state of a screen, based on a control signal provided from each remote control device 200.

Meanwhile, referring to FIG. 1B, a control device 250 may receive a broadcast signal, and process the signal and transmit it to the image display apparatus 100. The image display apparatus 100 may output an image based on a signal received from the control device 250.

The control device 250 may be a device that controls the image display apparatus 100. For example, the control device 250 may transmit a control signal for controlling the operation of the image display apparatus 100 to the image display apparatus 100.

When the control device 250 receives a broadcast signal, the control device 250 may correspond to a broadcast receiving apparatus. For example, the control device 250 may be a set-top box.

The control device 250 may receive a broadcast signal wirelessly through an antenna, or may receive a broadcast signal by wire through a cable.

The remote control device 200 may be connected to the image display apparatus 100 and/or the control device 250 by wire and/or wirelessly. For example, a single remote control device 200 may be connected to the image display apparatus 100 and the control device 250, and a plurality of remote control devices 200 may be connected to the image display apparatus 100 and the control device 250 respectively.

Figure 2:
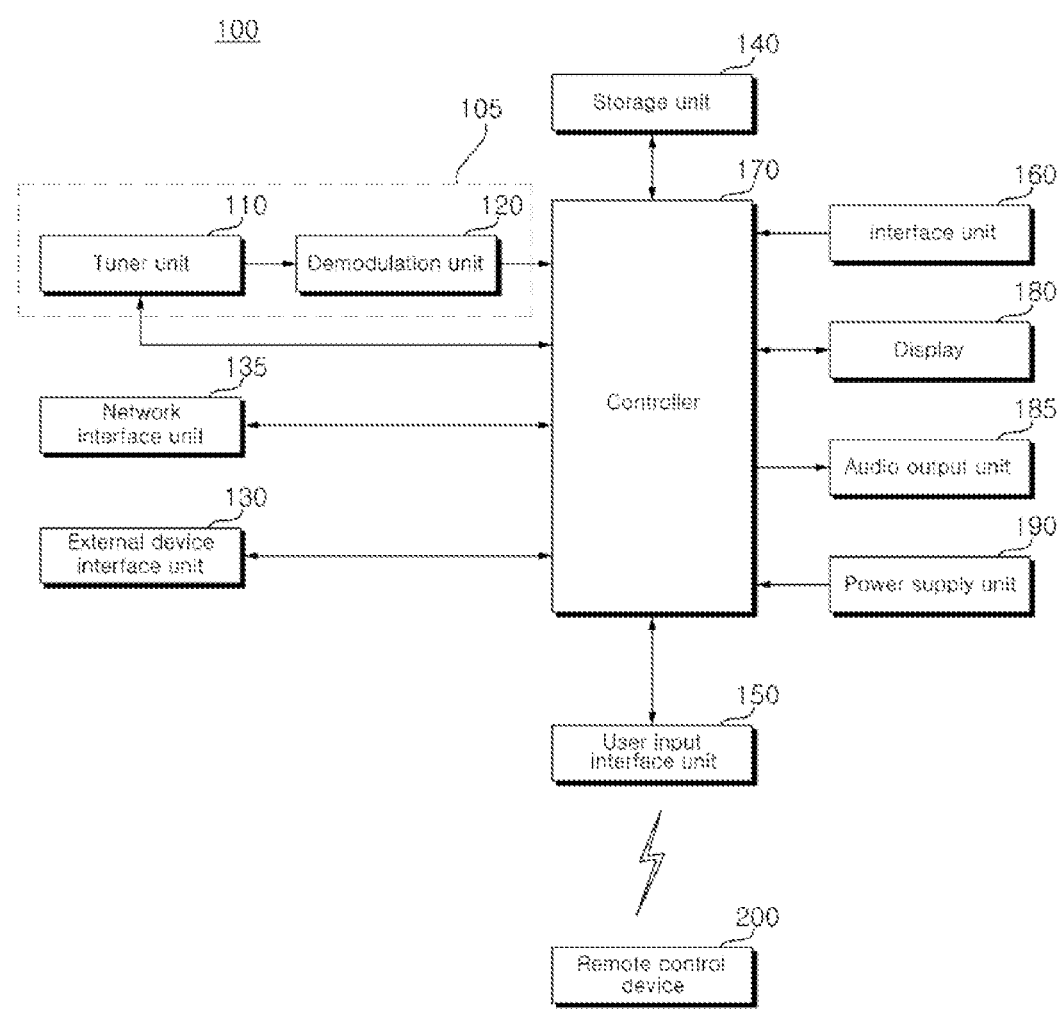
FIG. 2 is an internal block diagram of the image display apparatus of FIG. 1A.

FIG. 2 is an internal block diagram of the image display apparatus of FIG. 1A.

Referring to FIG. 2, the image display apparatus 100, which is an example of a broadcast receiving apparatus, may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

Meanwhile, the control device 250, which is another example of the broadcast receiving apparatus of FIG. 1B, may include at least some of the components included in the image display apparatus 100.

For example, the control device 150 may include a broadcast receiving unit 105, an external device interface unit 130, a network interface unit 135, a storage unit 140, a user input interface unit 150, an input unit 160, a controller 170, an audio output unit 185, and/or a power supply unit 190.

The broadcast receiving unit 105 may include a tuner unit 110 and a demodulation unit 120.

Meanwhile, unlike the drawing, the image display apparatus 100 can include only the broadcast receiving unit 105 and the external device interface unit 130, among the broadcast receiving unit 105, the external device interface unit 130, and the network interface unit 135. That is, the image display apparatus 100 may not include the network interface unit 135.

The tuner unit 110 may select a broadcast signal corresponding to a channel selected by a user or all previously stored channels among broadcast signals received through an antenna (not shown) or a cable (not shown). The tuner unit 110 may convert the selected broadcast signal into an intermediate frequency signal or a baseband image or a voice signal.

For example, if the selected broadcast signal is a digital broadcast signal, the tuner unit 110 may convert into a digital IF signal (DIF), and if the selected broadcast signal is an analog broadcast signal, may convert into an analog baseband image or a voice signal (CVBS/SIF). That is, the tuner unit 110 may process a digital broadcast signal or an analog broadcast signal. An analog baseband image or voice signal (CVBS/SIF) output from the tuner unit 110 may be directly input to the controller 170.

Meanwhile, the tuner unit 110 may sequentially select a broadcast signal of all broadcast channels stored through a channel storage function among the received broadcast signals, and convert the selected broadcast signal into an intermediate frequency signal or a baseband image or voice signal.

Meanwhile, the tuner unit 110 can include a plurality of tuners in order to receive broadcast signals of a plurality of channels. Alternatively, a single tuner that simultaneously receives broadcast signals of a plurality of channels is also possible.

The demodulation unit 120 may receive a digital IF signal DIF converted by the tuner unit 110 and perform a demodulation operation.

The demodulation unit 120 may output a stream signal TS after performing a demodulation and a channel decoding. In this case, the stream signal may be a signal obtained by multiplexing an image signal, a voice signal, or a data signal.

The stream signal output from the demodulation unit 120 may be input to the controller 170. After performing demultiplexing and image/voice signal processing, the controller 170 may transmit to the display device 200 through the external device interface unit 130.

The external device interface unit 130 may transmit or receive data to or from a connected external device. To this end, the external device interface unit 130 may include an A/V input/output unit (not shown).

The A/V input/output unit may transmit/receive signals to and from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, an High Definition Multimedia Interface (HDMI) terminal, a Mobile High-definition Link (MHL) terminal, an RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may be connected to the display device 200 such as a TV, and a monitor by wire/wirelessly, and may perform an input/output operation with the display device 200.

The external device interface unit 130 may include a wireless communication module (not shown) for short-range communication with an external device. Through such a wireless communication module, the external device interface unit 130 may exchange data with an adjacent mobile terminal. For example, the external device interface unit 130 may receive device information, executing application information, an application image, and the like from the mobile terminal, in a mirroring mode.

The external device interface unit 130 may perform short-range communication by using Bluetooth, Radio Frequency Identification (RFID), Infrared Data Association (IrDA), Ultra-Wideband (UWB), ZigBee, and the like.

The network interface unit 135 may provide an interface for connecting to a wired/wireless network including the Internet network. For example, the network interface unit 155 may receive content or data provided by the Internet, a content provider, or a network operator, through a network.

The network interface unit 135 may include a communication module (not shown) for connection to a wired/wireless network. For example, the network interface unit 135 may include a communication module for a Wireless LAN (WLAN) (Wi-Fi), a Wireless broadband (Wibro), a World Interoperability for Microwave Access (Wimax), a High Speed Downlink Packet Access (HSDPA), and the like.

The network interface unit 135 may transmit or receive data with other user or other electronic device through a connected network or other network linked to the connected network.

The storage unit 140 may store a program inside the controller 170 for processing and controlling each signal, or may store a signal-processed image, voice, or data signal. For example, the storage unit 140 stores application programs designed for the purpose of performing various tasks that can be processed by the controller 170, and upon request of the controller 170, may selectively provide some of the stored application programs.

The program stored in the storage unit 140, or the like is not particularly limited as long as it can be executed by the controller 170.

The storage unit 140 may perform a function for temporarily storing an image, voice, or data signal received from an external device through the external device interface unit 130.

The storage unit 140 may store data related to at least one broadcaster. Here, the broadcaster may include a terrestrial broadcaster, a satellite broadcaster, a cable broadcaster, and the like that transmit a broadcast signal. For example, data related to a satellite broadcaster may include the name of satellite, the frequency (C-band, Ku-band) used by a satellite to transmit a broadcast signal, an intermediate frequency, polarization, a symbol rate, and the like. For example, data related to cable broadcasters may include a frequency used by each broadcaster to transmit a broadcast signal, forward error correction (FEC) related data, and the like.

The storage unit 140 may store data related to a certain broadcast channel, through a channel storage function such as a channel map. For example, the storage unit 140 may store data related to a frequency band respectively corresponding to at least one broadcast channel. In this case, the storage unit 140 may store data related to a multiplier of a frequency band respectively corresponding to at least one broadcast channel, in consideration of a harmonic component of a broadcast signal.

FIG. 2 shows an embodiment in which the storage unit 140 is provided separately from the controller 170, but the scope of the present disclosure is not limited thereto, and the storage unit 140 may be included in the controller 170.

The storage unit 140 may include at least one of a volatile memory (e.g. DRAM, SRAM, SDRAM, etc.), and a non-volatile memory (e.g. a flash memory), a hard disk drive (HDD), a solid state drive (SSD), etc). In various embodiments of the present disclosure, the storage unit 140 and the memory may be used interchangeably.

The user input interface unit 150 may transmit a signal input by the user to the controller 170 or may transmit a signal from the controller 170 to the user. For example, transmit/receive user input signals such as power on/off, channel selection, and screen setting from the remote control device 300, or local keys (not shown) such as power key, channel key, volume key, and setting value transmits a user input signal input to the controller 170, transmits a user input signal input from a sensor unit (not shown) that senses a user's gesture to the controller 170, or transmits a signal from the controller 170 It can be transmitted to the sensor unit.

The input unit 160 may be provided on one side of the main body of the control device 100. For example, the input unit 160 may include a touch pad, a physical button, and the like.

The input unit 160 may receive various user commands related to the operation of the control device 100, and may transmit a control signal corresponding to the input command to the controller 170. The input unit 160 may transmit a control signal corresponding to the input command to the controller 170 through the user input interface unit 150.

The input unit 160 may include at least one microphone (not shown), and may receive a user's voice through a microphone.

The controller 170 may include at least one processor, and may control the overall operation of the control device 100 by using the included processor. Here, the processor may be a general processor such as a central processing unit (CPU). Obviously, the processor may be a dedicated device such as an ASIC or other hardware-based processor.

The controller 170 may demultiplex a stream input through the tuner unit 110, the demodulation unit 120, the external device interface unit 130, or the network interface unit 135, or may process the demultiplexed signals to generate and output a signal for image or voice output.

The image signal and/or the voice signal processed by the controller 170 may be transmitted to the display device 200 through the external device interface unit 130.

The voice signal processed by the controller 170 may be transmitted to the audio output unit 185.

The audio output unit 185 may include at least one speaker (not shown). The audio output unit 185 may receive the voice signal processed by the controller 170 to output as a voice.

Although not shown in FIG. 2, the controller 170 may include a demultiplexer, an image processing unit, and the like. This will be described later with reference to FIG. 3.

In addition, the controller 170 may control overall operations inside the control device 100.

For example, the controller 170 may control the tuner unit 110 to tune a broadcast corresponding to a channel selected by a user or a pre-stored channel.

Meanwhile, the control device 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in an upper portion of the control device 100 or may be separately disposed. Image information photographed by the photographing unit may be input to the controller 170.

The controller 170 may recognize the position of a user, based on the image photographed by the photographing unit. For example, the controller 170 may determine a distance (z-axis coordinate) between a user and the control device 100.

The controller 170 may detect user's gesture based on the image photographed by the photographing unit, or each or a combination of signals detected from the sensor unit.

The power supply unit 190 may supply a corresponding power throughout the control device 100. In particular, it is possible to supply power to the controller 170 that can be implemented in the form of a system on chip (SOC), the audio output unit 185 for outputting an audio, and the like.

Specifically, the power supply unit 190 may include a converter (not shown) that converts AC power into DC power, and a Dc/Dc converter (not shown) that converts the level of DC power.

The remote control device 300 may transmit a user input to the user input interface unit 150. To this end, the remote control device 300 may use Bluetooth, Radio Frequency (RF) communication, Infrared Radiation communication, Ultra-wideband (UWB), ZigBee method, etc. In addition, the remote control device 300 may receive an image, a voice, or a data signal output from the user input interface unit 150, and the remote control device 300 can display or voice-output the received image, voice, or data signal.

Meanwhile, the block diagram of the control device 100 shown in FIG. 2 is just a block diagram for an embodiment of the present disclosure, and each component of the block diagram may be incorporated, added, or omitted depend on a specification of the control device 100 that is actually implemented.

That is, two or more components may be combined into a single component, or a single component may be subdivided into two or more components as needed. In addition, the function performed in each block is for explaining the embodiment of the present disclosure, and the specific operation or device does not limit the scope of the present disclosure.

Figure 3:
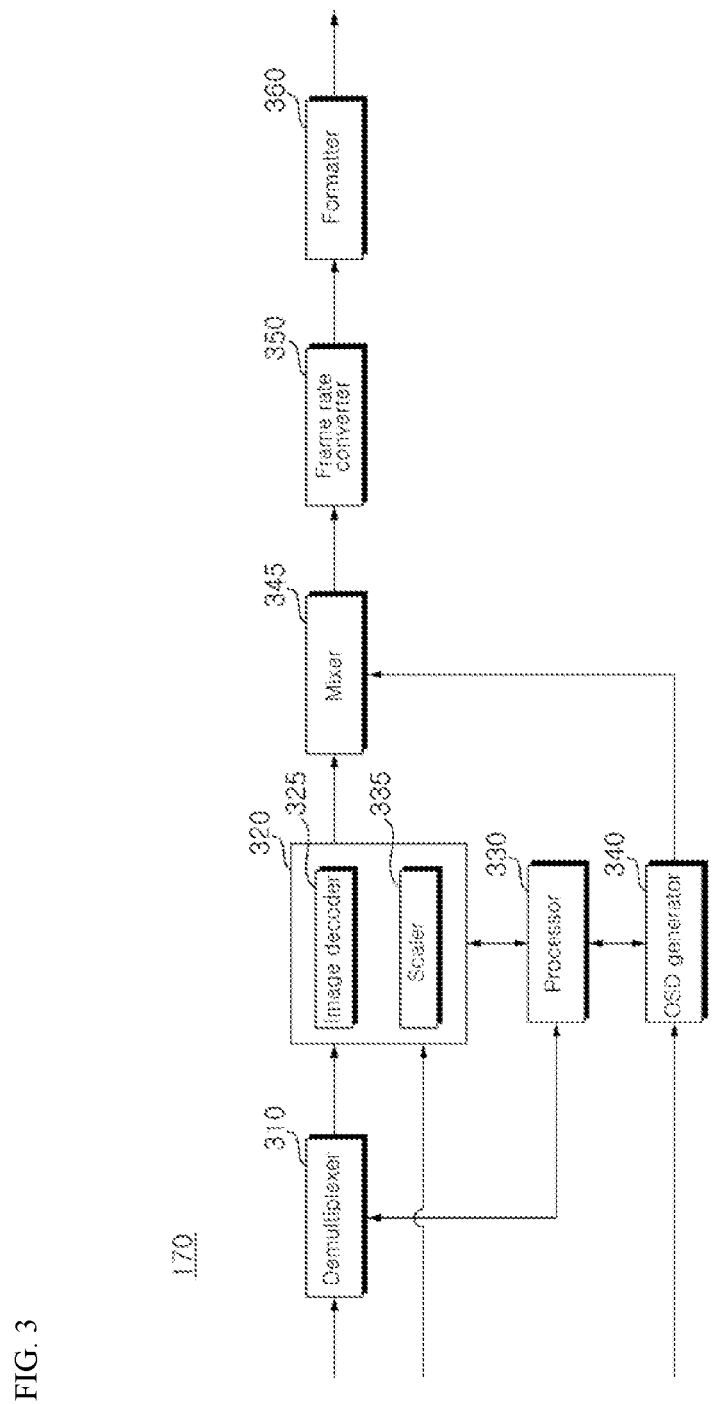
FIG. 3 is an internal block diagram of a controller of FIG. 2.

FIG. 3 is an internal block diagram of the controller of FIG. 2A.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit (not shown) and a data processing unit (not shown) may be further included.

The demultiplexer 310 may demultiplex an input stream. For example, when MPEG-2 TS is input, it can be demultiplexed and separated into image, voice, and data signal. Here, the stream signal input to the demultiplexer 310 may be a stream signal output from the tuner unit 110, the demodulation unit 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include a decoder of various standards. For example, it may include an MPEG-2, H, 264 decoder, a 3D image decoder for a color image and a depth image, a decoder for a multi-view image, and the like.

The processor 330 may control overall operations inside the image processing device 100 or the controller 170. For example, the processor 330 may control the tuner unit 110 to tune a broadcast corresponding to a channel selected by a user or a pre-stored channel.

In addition, the processor 330 may control the image processing device 100 according to a user command input through the user input interface unit 150 or an internal program.

In addition, the processor 330 may perform data transmission control with the network interface unit 135 or the external device interface unit 130.

In addition, the processor 330 may control operations of the demultiplexer 310, the image processing unit 320, the OSD generator 340, and the like inside the controller 170.

The OSD generator 340 may generate an OSD signal according to a user input or by itself. For example, a signal for displaying various types of information as a graphic or a text on the screen of the display 180 may be generated, based on a user input signal input through the input unit 160.

The generated OSD signal may include various data such as a user interface screen of the image processing device 100, various menu screens, a widget, and an icon. In addition, the generated OSD signal may include a 2D object or a 3D object.

In addition, the OSD generator 340 may generate a pointer that can be displayed on the display 180, based on a pointing signal input from the remote control device 200. The OSD generator 340 may include a pointing signal processing unit (not shown) that generates a pointer. A pointing signal processing unit (not shown) may be provided separately instead of being provided in the OSD generator 240.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly, without a separate frame rate conversion.

The formatter 360 may arrange a left-eye image frame and a right-eye image frame of the frame rate-converted 3D image. In addition, it may output a synchronization signal Vsync for opening the left eye glass and the right eye glass of a 3D viewing device (not shown).

Meanwhile, the formatter 360 may convert the format of an input image signal into an image signal that is to be displayed on the display 180, and output it.

In addition, the formatter 360 may change the format of the 3D image signal. For example, it may change into any one format of various 3D formats such as Side by Side format, Top/Down format, Frame Sequential format, Interlaced format, and Checker Box format.

Meanwhile, the formatter 360 may convert a 2D image signal into a 3D image signal. For example, according to a 3D image generation algorithm, it may detect an edge or a selectable object from a 2D image signal, and separate an object according to the detected edge or the detected selectable object into a 3D image signal. In this case, as described above, the generated 3D image signal may be separated and arranged into a left-eye image signal L and a right-eye image signal R.

Meanwhile, although not shown in the drawing, it is also possible that a 3D processor (not shown) for processing a 3-dimensional effect signal is further disposed, after the formatter 360. Such a 3D processor may process brightness, tint, and color adjustment of an image signal so as to improve a 3D effect. For example, signal processing or the like that makes a near field to be clear and makes a far distance to be blurry may be performed. Meanwhile, the function of the 3D processor may be merged into the formatter 360 or integrated into the image processing unit 320.

Meanwhile, the audio processing unit (not shown) in the controller 170 may perform audio processing of the demultiplexed voice signal. To this end, the audio processing unit (not shown) may include various decoders.

In addition, the audio processing unit (not shown) in the controller 170 may process a Base, a Treble, a volume control, and the like.

A data processing unit (not shown) in the controller 170 may perform data processing of the demultiplexed data signal. For example, when the demultiplexed data signal is an encoded data signal, it can be decoded. The encoded data signal may be electronic program guide information including broadcast information such as start time and end time of a broadcast program aired on each channel.

Meanwhile, the block diagram of the controller 170 shown in FIG. 3 is only a block diagram for an embodiment of the present disclosure, and each component of the block diagram may be integrated, added, or omitted according to the specification of the controller 170 that is actually implemented.

In particular, the frame rate converter 350 and the formatter 360 may not be provided in the controller 170, but may be separately provided, or may be provided as a separate single module.

Figure 4:
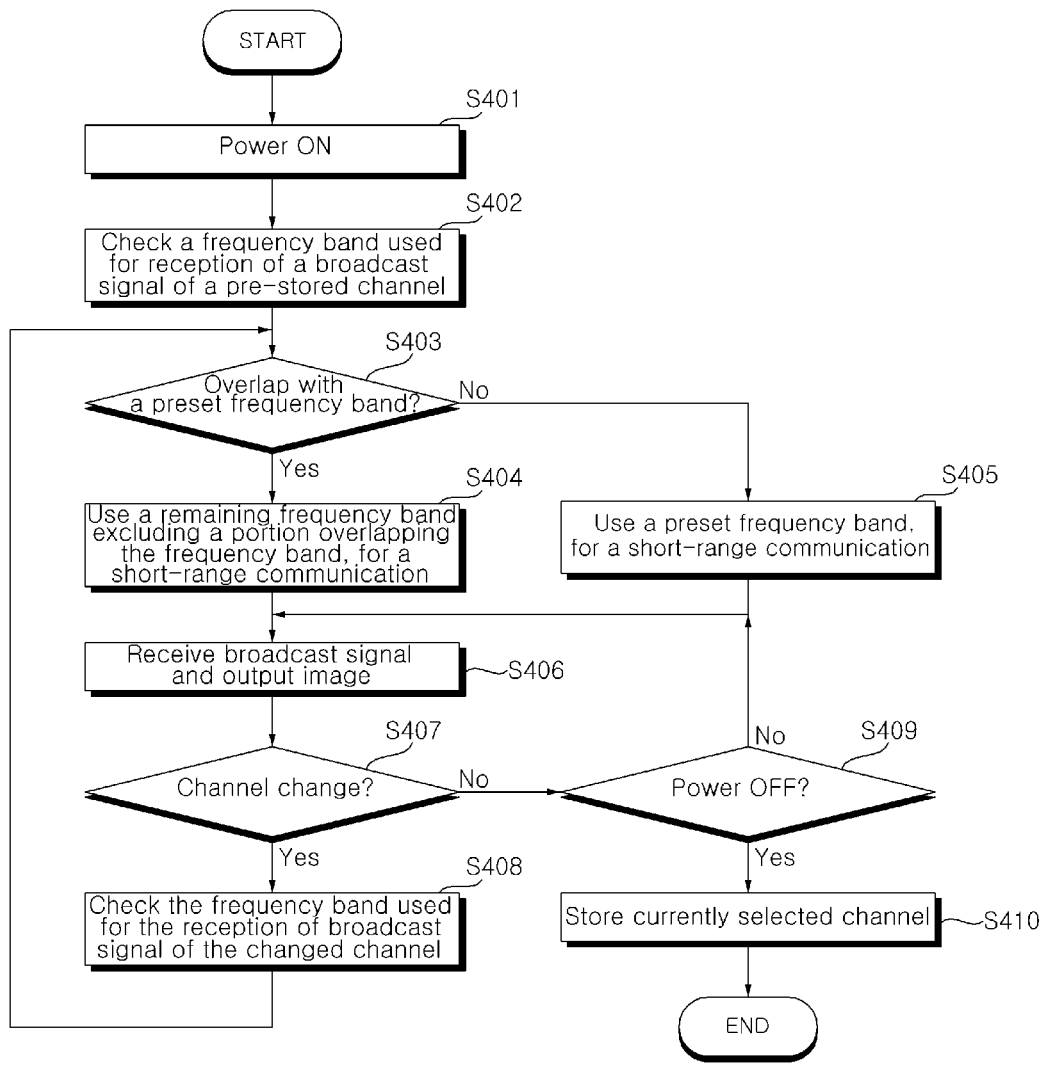
FIG. 4 is a flowchart of a method of operating a broadcast receiving apparatus, according to an embodiment of the present disclosure.
Figure 5:
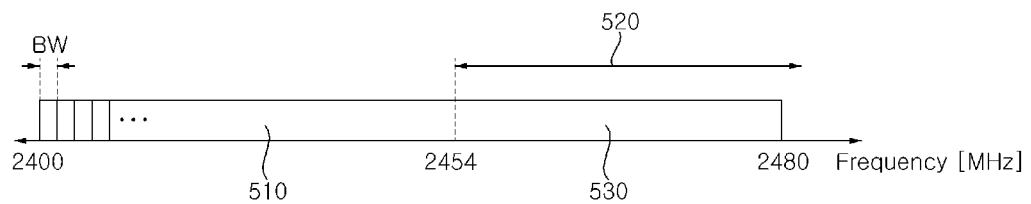
FIGS. 5 and 6 are diagrams for explaining an operation method of a broadcast receiving apparatus.
Figure 6:
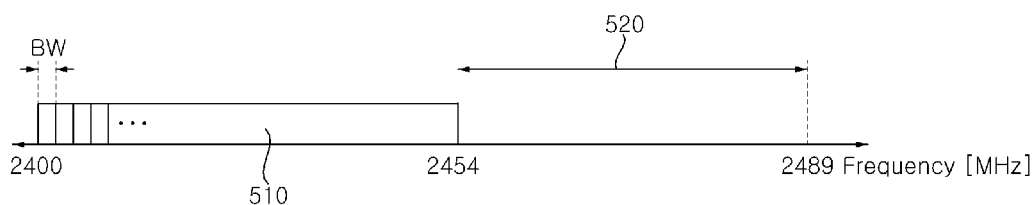

FIG. 4 is a flowchart of a method of operating a broadcast receiving apparatus, according to an embodiment of the present disclosure, and FIGS. 5 and 6 are diagrams for explaining an operation method of a broadcast receiving apparatus. Hereinafter, in the description of the present disclosure, it will be described based on the image display apparatus 100 as an example of a broadcast receiving apparatus, but the present disclosure is not limited thereto, and it can be understood that the control device 250 also operates identically with/similarly to the image display apparatus 100.

Referring to FIG. 4, the image display apparatus 100 may turn on power, at operation S401. For example, when receiving a signal for turning on the power from the remote control device 200, or when receiving a signal for pressing a power key provided in the input unit 160 is received in a state in which the power is turned off, the image display apparatus 100 may turn on the power.

When the power is turned on, the image display apparatus 100 may check a frequency band used for reception of a broadcast signal of a pre-stored channel, at operation S402. Here, the pre-stored channel may mean a channel selected as a main channel before the power of the image display apparatus 100 is turned off.

For example, the image display apparatus 100 may store data related to the main channel at the time when the power is turned off in the storage unit 140, and when the power is turned on, determine a channel selected as the main channel at the time when the power is turned off as the main channel, based on the data stored in the storage unit 140. In this case, the image display apparatus 100 may check a frequency band corresponding to the channel determined as the main channel, based on the data related to the frequency band respectively corresponding to at least one broadcast channel stored in the storage unit 140.

Meanwhile, when receiving a broadcast signal wirelessly through an antenna, the image display apparatus 100 may check the frequency band used for reception of the broadcast signal, and when receiving the broadcast signal by wire through a cable, may omit the performance of operation related to the checking of the frequency band used for the reception of the broadcast signal.

At operation S403, the image display apparatus 100 may determine whether a frequency band corresponding to the main channel and a frequency band (hereinafter, referred to as a first frequency band) preset for short-range communication overlap. Here, the first frequency band may be set to correspond to each of the short-range communication methods. For example, the first frequency band for the Bluetooth method may be preset to 2400 to 2480 MHz. For example, the first frequency band for the ZigBee method may be set to 902 to 928 MHz, 2400 to 2483.5 MHz, or the like, depending on a region.

In this case, the image display apparatus 100 may also determine whether at least a portion of the first frequency band overlaps with a multiplier of a frequency corresponding to the main channel. For example, if the frequency band corresponding to the main channel is 801.25 Mhz which is the frequency band of terrestrial broadcasting in North America, the image display apparatus 100 may determine whether any one of 801.25 Mhz band, 1602.50 Hz band that is 2 multiplier, and 2403.75 MHz band that is 3 multiplier overlaps with at least a portion of the first frequency band.

At operation S404, when at least a portion of the first frequency band overlaps with the frequency band corresponding to the main channel, the image display apparatus 100 may determine a remaining frequency band (hereinafter, a second frequency band) excluding a portion overlapping the frequency band corresponding to the main channel, among the first frequency band, as a frequency band used for short-range communication.

In addition, when at least a portion of the first frequency band overlaps with a multiplier of a frequency corresponding to the main channel, the image display apparatus 100 may determine a remaining frequency band excluding a portion overlapping the multiplier of the frequency band corresponding to the main channel, among the first frequency band, as a frequency band used for short-range communication.

Meanwhile, at operation S405, when the first frequency band and the frequency band corresponding to the main channel do not overlap, the image display apparatus 100 may determine the entire first frequency band as a frequency band used for short-range communication. In this regard, it will be described with reference to FIGS. 5 and 6.

Referring to FIGS. 5 and 6, when the short-range communication method used by the image display apparatus 100 is the Bluetooth method, the first frequency band may be set to 2400 to 2480 MHz, and a plurality of channels having a bandwidth (BW) of 1 MHz or 2 MHz may be used for short-range communication.

At this time, when the frequency band 520 corresponding to the main channel is 2454 to 2489 MHz, the image display apparatus 100 may check that the frequency band 510 of 2400 to 2454 MHz among the first frequency band does not overlap the frequency band 520 corresponding to the main channel, but the frequency band 530 of 2454 to 2480 MHz overlaps the frequency band 520 corresponding to the main channel.

As the frequency band 530 of 2454 to 2480 MHz among the first frequency band overlaps the frequency band 520 corresponding to the main channel, the image display apparatus 100 may determine the frequency band 510 of 2400 to 2454 MHz, which is the remaining frequency band excluding a corresponding frequency band 530, as the second frequency band used for short-range communication.

Meanwhile, when a plurality of short-range communications are used, the image display apparatus 100 may determine whether frequency bands respectively used for a plurality of short-range communications overlap each other. In addition, when the frequency bands used for a plurality of short-range communication overlap each other, the image display apparatus 100 may reset a remaining frequency band excluding a band overlapping the frequency band used for the second short-range communication, among the frequency bands set to be used for the first short-range communication, to be used for the first short-range communication. For example, in a state in which the first frequency band of the Bluetooth method is preset to a frequency band 510 of 2400 to 2454 MHz, the image display apparatus 100 may use a frequency band of 2401 to 2423 MHz for short-range communication of the Wi-Fi method. At this time, the image display apparatus 100 may determine the second frequency band used for short-range communication of the Bluetooth method as 2423 to 2454 MHz excluding all of the frequency band 520 corresponding to the main channel among the first frequency band and the frequency band used for short-distance communication of the Wi-Fi method.

Meanwhile, when performing short-range communication with an external device, the image display apparatus 100 may use a frequency hopping method for rapidly changing a channel used for communication according to a specific pattern, in order to prevent radio interference or noise interference.

In this case, in configuring a channel change pattern (hereinafter, a frequency hopping sequence) for frequency hopping, the image display apparatus 100 may configure a frequency hopping sequence by a channel of the entire first frequency band, when the first frequency band and the frequency band corresponding to the main channel do not overlap, and may configure a frequency hopping sequence by only the channel of the second frequency band excluding an overlapping portion, when at least a portion of the first frequency band overlaps the frequency band corresponding to the main channel.

Meanwhile, when the main channel is changed while the image display apparatus 100 is communicatively connected to an external device, it may be determined whether to reconfigure the frequency hopping sequence, based on the result of determining whether the frequency band corresponding to the changed main channel and the first frequency band overlap. For example, the main channel is changed while the image display apparatus 100 performs short-range communication through a frequency hopping sequence consisting of channel of the entire first frequency band, when the frequency band corresponding to the changed main channel and at least a portion of the first frequency band overlap, the image display apparatus 100 may determine to reconfigure the frequency hopping sequence.

At this time, when reconfiguring the frequency hopping sequence, the image display apparatus 100 may generate data (hereinafter, data related to frequency hopping) related to the reconfigured frequency hopping sequence, may transmit the generated data to a communication-connected external device, and may perform a short-range communication with an external device by using the reconfigured frequency hopping sequence.

Meanwhile, in a state in which the image display apparatus 100 is not connected to an external device, when the frequency hopping sequence is reconfigured as the frequency band corresponding to the main channel and the first frequency band overlap, a communication connection with an external device may be attempted by using the reconfigured frequency hopping sequence.

Alternatively, when the frequency band corresponding to the main channel and the first frequency band overlap, the image display apparatus 100 may transmit an arbitrary signal through a frequency band (hereinafter, referred to as a third frequency band) in which the frequency band corresponding to the main channel and the first frequency band overlap. In this case, the image display apparatus 100 and/or the external device may check that the communication success rate and communication performance efficiency in the third frequency band are lowered by an arbitrary signal occupying the third frequency band, and may determine to perform short-range communication by using the second frequency band which is the remaining frequency band excluding the third frequency band.

Referring back to FIG. 4, at operation S406, the image display apparatus 100 may receive a broadcast signal of the main channel through the broadcast receiving unit 105, and process the received broadcast signal to output an image through the display 180.

The image display apparatus 100 may check whether the main channel is changed, at operation S407. For example, the image display apparatus 100 may check whether a signal corresponding to a user input for changing a main channel is received through the user input interface unit 150 and/or the input unit 160.

At operation S408, when the main channel is changed, the image display apparatus 100 may check the frequency band corresponding to a channel changed to the main channel, based on the data for the frequency band respectively corresponding to at least one broadcast channel stored in the storage unit 140.

In addition, the image display apparatus 100 may branch to operation S403 to determine again whether the frequency band corresponding to the channel changed to the main channel overlaps with the first frequency band.

Meanwhile, the image display apparatus 100 may check whether the power is turned off, at operation S409. For example, when a signal for turning off the power is received from the remote control device 200, or a signal for pressing the power key provided in the input unit 160 in the state the power is turned-on is received, the power may be turned off.

When the power is not turned off, the image display apparatus 100 may continue to receive the broadcast signal of the main channel until the power is turned off, and process the received broadcast signal to output an image through the display 180.

Meanwhile, when the power is turned off, at operation S410, the image display apparatus 100 may store data related to a channel currently selected as a main channel in the storage unit 140. Alternatively, the image display apparatus 100 may update data related to the channel selected as the main channel stored in the storage unit 140, whenever the main channel is determined or changed.

As described above, according to various embodiments of the present disclosure, when a frequency band used for reception of a broadcast signal and a frequency band set to be used for short-range communication overlap with each other, among the frequency bands set to be used for short-range communication, the remaining frequency band excluding the band overlapping the frequency band used for receiving broadcast signals is reset to be used for short-range communication, thereby preventing distortion of a broadcast signal and deterioration of communication performance between the broadcast receiving apparatus and the remote control device.

In addition, according to various embodiments of the present disclosure, whenever a main channel is determined or changed, it is determined whether the frequency band used for receiving broadcast signals and the frequency band set to be used for short-range communication overlap, based on data related to a frequency band corresponding to the broadcast channel stored in the broadcast receiving apparatus. Therefore, an operation of transmitting and receiving data with an external device to determine whether communication performance is deteriorated, or an operation of processing data to determine whether communication performance is deteriorated may be omitted, thereby reducing a processing operation, and more quickly determining whether communication performance is deteriorated.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, the method of operating a broadcast receiving apparatus of the present disclosure can be implemented as processor-readable codes on a processor-readable recording medium provided in the broadcast receiving apparatus. The processor-readable recording medium includes all types of recording devices in which data readable by the processor is stored. Examples of the processor-readable recording medium include a ROM, a RAM, a CD-ROM, a magnetic tape, a floppy disk, an optical data storage device, and the like, and may also be implemented in the form of a carrier wave such as transmission over the Internet. In addition, the processor-readable recording medium may be distributed over network-connected computer systems so that code readable by the processor can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A broadcast receiving apparatus comprising:
   a receiver configured to wirelessly receive a broadcast signal;
   an transmitter configured to perform short-range communication; and
   a controller,
   wherein the controller determines whether a frequency band used for reception of the broadcast signal corresponding to one of broadcast channels set as a main channel overlaps with a first frequency band preset for the short-range communication,
   when the frequency band used for reception of the broadcast signal and the first frequency band do not overlap, determines the first frequency band as a frequency band used for the short-range communication,
   when at least a portion of the first frequency band overlaps with the frequency band used for reception of the broadcast signal, determines a second frequency band which is a remaining frequency band, among the first frequency band, excluding a portion overlapping with the frequency band used for reception of the broadcast signal, as the frequency band used for the short-range communication,
   when the main channel is changed in a state of communicatively connected with an external device that is a target of the short-range communication, generates data related to frequency hopping, based on a result of determining whether a frequency band corresponding to the changed main channel and the first frequency band overlap, and
   transmits the generated data related to frequency hopping to the external device, through the transmitter.

2. The broadcast receiving apparatus of claim 1, further comprising a memory for storing data related to a frequency band corresponding to at least one broadcast channel,
   wherein the controller determines any one of the at least one broadcast channel as the main channel, according to a preset reference or a user input, and
   determines whether a frequency band corresponding to the main channel overlaps with the first frequency band, based on data related to the frequency band stored in the memory.

3. The broadcast receiving apparatus of claim 2, wherein when power of the broadcast receiving apparatus is turned on, the controller determines, as the main channel, a first broadcast channel selected before the power of the broadcast receiving apparatus is turned off.

4. The broadcast receiving apparatus of claim 3, wherein when the main channel is changed to a second broadcast channel according to a user input, the controller determines again whether a frequency band corresponding to the changed main channel overlaps with the first frequency band, based on data related to the frequency band stored in the memory.

5. A method of operating a broadcast receiving apparatus, the method comprising:
   determining whether a frequency band used for reception of a broadcast signal corresponding to one of broadcast channels set as a main channel and a first frequency band preset for short-range communication overlap;
   determining the first frequency band as a frequency band used for the short-range communication, when the frequency band used for reception of broadcast signal and the first frequency band do not overlap; and
   determining a second frequency band, which is a remaining frequency band excluding a portion overlapping the frequency band used for reception of broadcast signal among the first frequency band, as the frequency band used for the short-range communication, when at least a portion of the first frequency band overlaps with the frequency band used for reception of broadcast signal,
   when the main channel is changed in a state of communicatively connected with an external device that is a target of the short-range communication, generating data related to frequency hopping, based on a result of determining whether a frequency band corresponding to the changed main channel and the first frequency band overlap; and
   transmitting the generated data related to frequency hopping to the external device.

6. The method of claim 5, further comprising determining any one of at least one broadcast channel as the main channel, according to a preset reference or a user input,
   wherein determining whether a frequency band used for reception of broadcast signal and a first frequency band preset for short-range communication overlap comprises determining whether the frequency band corresponding to the main channel and the first frequency band overlap, based on data, which is stored in a memory of the broadcast receiving apparatus, related to a frequency band corresponding to the at least one broadcast channel.

7. The method of claim 6, wherein determining any one of at least one broadcast channel as a main channel comprises determining, as the main channel, a first broadcast channel selected before power of the broadcast receiving apparatus is turned off, when the power of the broadcast receiving apparatus is turned on.

8. The method of claim 7, wherein determining any one of at least one broadcast channel as a main channel further comprises, when a user input for changing the main channel into a second broadcasting channel is received, determining the second broadcasting channel as the main channel, and wherein determining whether the frequency band corresponding to the main channel and the first frequency band overlap further comprises, when the main channel is changed, determining again whether a frequency band corresponding to the changed main channel and the first frequency band overlap.

* * * * *